April 14, 1964
K. ROOZENDAAL
3,129,082
COLUMN FOR FRACTIONATING GAS MIXTURE
Filed May 5, 1961
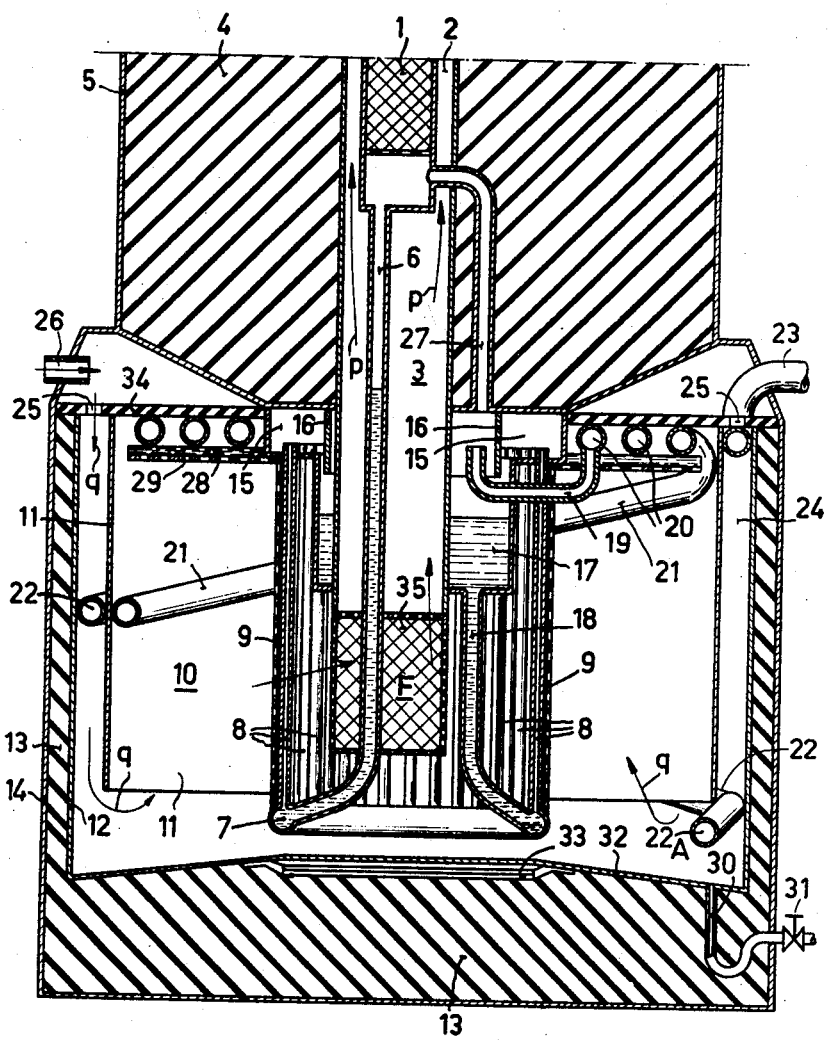
INVENTOR
KLAAS ROOZENDAAL.
BY
Frank R. ⎯⎯⎯
AGENT

United States Patent Office 3,129,082
Patented Apr. 14, 1964

3,129,082
COLUMN FOR FRACTIONATING GAS MIXTURE
Klaas Roozendaal, Emmasingel, Eindhoven, Netherlands, assignor to North American Philips Company, Inc., New York, N.Y., a corporation of Delaware
Filed May 5, 1961, Ser. No. 108,068
Claims priority, application Netherlands May 7, 1960
5 Claims. (Cl. 62—42)

The invention relates to a column for fractionating a gas mixture, for example air, comprising a boiling vessel adapted to collect liquid gas, while in the proximity of this vessel a support for example of gauze cooled by the liquid gas in the vessel and pervious to the air to be fractionated is provided and the vessel communicates with a duct to conduct cold gas out of the boiling vessel, this duct being arranged mainly in a chamber surrounding the support and protected from heat losses and having an inlet for the air to be fractionated.

Such a gas fractionating column is known.

The support, to be termed hereinafter briefly the gauze, serves to separate impurities such as water and carbon dioxide from the traversing gas mixture conducted towards the fractionating column, so that these impurities cannot enter into the column where they could produce stoppage by the formation of ice. The impurities are separated from the gas mixture in the form of snow, which is deposited on the gauze. This is only successful when the gauze is strongly cooled. To this end the liquid gas in the boiling vessel is used in the column according to the invention, this gas being conducted out of the boiling vessel through a duct which becomes locally very cold.

It has now been found that in the gas mixture conducted around the gauze in the chamber strong whirl effects may occur due to convection. A disadvantageous result thereof is that the gauze is blocked too soon, or in other words, the snow layer on the gauze becomes impermeable.

It has now been found that these whirls and their detrimental effect may be mitigated and obviated by providing, in accordance with the invention, at least part of the cold duct in the chamber for conducting liquid gas out of the boiling vessel with heat insulation. This applies particularly to the coldest part of the said duct. The heat insulation need not be perfect. It may be comparatively thin and be made for example from a blanket or skin of glass wool or a similar, preferably incombustible material. Suitable material is, for example, slag wool or stone wool and the like.

When carrying out the invention dense fog of fine ice crystals, whirling in the gas and causing a prompt stoppage of the snow layer on the gauze is formed in the chamber around the gauze.

The insulating layer on the coldest portion of the said duct for conducting liquid gas out of the boiling vessel results in spreading out of the cold transfer over a larger surface with smaller temperature differences. This spreading is furthered by supporting the insulating material from a perforated metal plate, for example of copper or brass.

In one embodiment of the invention part of the duct is arranged in a helical shape in the top part of the chamber, while underneath the duct a blanket of insulating material is provided.

The duct may be prolonged after this insulated portion in a non-insulated portion located inside the chamber and taken to the outer side.

In a practical embodiment of the invention the insulated duct portion is connected, in the direction of the outlet, with a duct portion which is partly located in a gap between a screen or ring of metal, for example brass or copper and the insulation of the chamber, this gap being provided on top with one or more inlet apertures for the gas mixture.

The drawing shows diagrammatically one embodiment in a longitudinal section of the lower portion of an air fractionating column.

The column F extends with a portion (not shown) upwards. Reference numeral 1 designates the lower portion of the column proper. The column may, as usual, be surrounded for example by Raschig rings. As an alternative plates may be used. This portion 1 is surrounded by an annular channel 2, in which air to be fractionated from the space 3 is conveyed upwards in the direction of the arrow p towards a higher place in the column, where the air is introduced into the column space proper to be subjected to the fractionating process. The annular channel 2 is surrounded by a heavy insulation 4, which is housed in a housing 5.

The bottom of the portion 1 of the column has an outlet 6, which leads to a ring 7, from which good conducting pipes 8 project upwards. The pipes 8 constitute a cage or frame to which a cylinder of metal gauze 9 is soldered. This gauze 9 is surrounded by a chamber or receptacle 10, in which a metal, annular screen 11 is suspended at a given distance from the inner wall 12 of the chamber, which is surrounded by insulating material 13, accommodated in a housing 14. During operation liquid gas boils in the pipes 8, which gas is formed mainly by oxygen. The pipes 8 open out at the top in a space 15, which gives access along an annular screen 16 to a vessel 17, in which liquid gas boils. The bottom of the vessel 17 communicates through a downtake pipe 18 with the ring 7.

At the top of the vessel 17 there is an outlet duct 19 for cold, gaseous oxygen. This duct opens out into a helical duct 20, arranged in the top part of the chamber 10, this duct leading downwards through a turn 21 inside the screen 11 to the place 22A and then through a turn 22 upwards to the outlet 23 which conducts oxygen gas to the outer side.

The turn 22 is located in the annular gap 24 between the screen 11 and the inner wall 12. The gap 24 is provided at the top with an inlet opening 25 for air to be fractionated and supplied at 26.

It should be noted that the column shown by way of example serves to obtain liquid nitrogen from the air supplied. This takes place in the column 1. The outlet of liquid nitrogen is located in a higher portion of the column and is not shown.

Reference numeral 27 designates a duct which conveys gas from the vessel 17 back to the column 1.

Underneath the very cold portion of the duct formed by the helices 20 is arranged a blanket or skin 28 of glass wool, which is supported from a perforated plate 29 of metal, for example copper or brass.

At 30 is designated a duct provided with a stop valve 31 for the outlet of water from the bottom 32 of the chamber 10. This water is produced by thawing the snow deposited during operation particularly in the form of an annular cake on the gauze 9, when the chamber 10 is cleaned. Thawing may be carried out by means of an electric heating element 33, which may be arranged for example in the insulation 13 and is secured to the bottom 32.

During operation the gauze 9 is strongly cooled by liquid gas flowing through the pipes 8.

The air to be fractionated enters the chamber 10 through the openings 25, which are evenly distributed over the circumference of an insulating plate 34. To this plate 34 is also secured the vessel 17 with the chamber 15 and the pipe cage 7, 8. Moreover, to this plate 34 are also secured the wall 12 and the housing 14, so that the chamber 10 inclusive of the annular gap 24 is satisfactorily insulated.

The air entering the gap 24 is precooled on the turn 22 of the outlet duct for the cold oxygen. The ice deposit from the air on this turn is not troublesome.

The air enters the chamber 10 in the direction of the arrows $q$ and from there it flows through the snow cake deposited on the gauze 9 and through the gauze 9, the space in the pipe cage 8 and the filter 35, the space 3 and the annular gap 2 upwards towards the column. The snow cake grows gradually on the gauze 9, i.e., against the supply direction of the air.

In the annular gap 2 the air is further cooled on the cold wall of the column 1.

The filter 35 collects part of the moisture, when no snow has yet been formed on the gauze 9.

The screen 11 is also cooled by convection in the chamber 10 and operates as a water separator at high thawing points of the entering air. At 30 water is constantly drained off. The screen 11 reduces, moreover, the insulation loss, since the insulating sheath 13 is screened by it from extremely cold parts.

When carrying out the invention it is found that the resistance to flow in the snow cake formed on the gauze 9 does not increase rapidly.

The capacity of the system thus constructed for separating out water and carbon dioxide is such that a column of this structure is capable of operating for one week without interruption for defrosting purposes. It is found that after this time about 8 kilograms of snow will be separated out. The behaviour is satisfactorily constant in a wide range of air humidity.

What is claimed is:

1. A column for fractionating a gas mixture comprising a boiling vessel for collecting liquid gas, said column being provided with a liquid gas outlet at the bottom thereof and pipes connected thereto and said boiling vessel, said pipes forming a frame around said boiling vessel, said frame having a gauze secured thereto and located in close proximity to said boiling vessel and cooled by the liquid gas in said pipes, said gauze being pervious to the supplied gas mixture to be fractionated, a duct communicating with said boiling vessel and for conducting cold gas therefrom, a receptacle surrounding and containing said gauze frame, said duct being located principally within said receptacle and being in communication with the top of said boiling vessel, an inlet in said receptacle for supplying said gas mixture to be fractionated, and at least part of said duct being provided with a heat insulation means adjacent to the top of said receptacle and supporting said part of said duct.

2. A column for fractionating a gas mixture comprising a boiling vessel for collecting liquid gas, said column being provided with a liquid gas outlet at the bottom thereof and pipes connected thereto and said boiling vessel, said pipes forming a frame around said boiling vessel, said frame having a gauze secured thereto and located in close proximity to said boiling vessel and cooled by the liquid gas in said pipes, said gauze being pervious to the supplied gas mixture to be fractionated, a duct communicating with said boiling vessel and for conducting cold gas therefrom, a receptacle surrounding and containing said gauze frame, said duct being located principally in said receptacle and having part thereof in a helical form in the top of said receptacle, an inlet in said receptacle for supplying said gas mixture to be fractionated, and a blanket of glass wool insulating material located underneath and adjacent to said helical part of the duct.

3. A column for fractionating a gas mixture as claimed in claim 2 wherein said duct is provided with an elongated part that is not insulated.

4. A column for fractionating a gas mixture comprising a boiling vessel for collecting liquid gas, said column being provided with a liquid gas outlet at the bottom thereof and pipes connected thereto and said boiling vessel, said pipes forming a frame around said boiling vessel, said frame having a gauze secured thereto and located in close proximity to said boiling vessel and cooled by the liquid gas in said pipes, said gauze being pervious to the supplied gas mixture to be fractionated, a duct communicating with said boiling vessel and for conducting cold gas therefrom, a receptacle surrounding and containing said gauze frame, said duct being located principally in said receptacle and in communication with the top of said boiling vessel, an inlet in said receptacle for supplying said gas mixture to be fractionated, and at least part of said duct being provided with a heat insulation means adjacent to the top of said receptacle and supporting said part of said duct, and an insulating plate provided with at least one opening therethrough in the top of said receptacle, said part of said duct provided with said heat insulation means being located between said insulating plate and said heat insulation means, and said opening being for the passage of said gas mixture therethrough and into said inlet.

5. A column for fractionating a gas mixture as claimed in claim 1 further comprising a heating element in the bottom of said receptacle and underneath said gauze and a duct located in the bottom of said receptacle for conducting away the melted deposit on the floor of said receptacle from said gauze.

References Cited in the file of this patent
UNITED STATES PATENTS

| | | |
|---|---|---|
| 677,323 | Pictet | June 25, 1901 |
| 1,873,418 | Jones | Aug. 23, 1932 |
| 2,503,939 | Baufre | Apr. 11, 1950 |
| 2,802,345 | Jonkers et al. | Aug. 13, 1957 |
| 2,867,985 | Ster | Jan. 13, 1959 |
| 2,895,303 | Streeter | July 21, 1959 |